May 9, 1933.   R. R. HUNT   1,908,425
LINER
Filed March 17, 1930   3 Sheets-Sheet 1
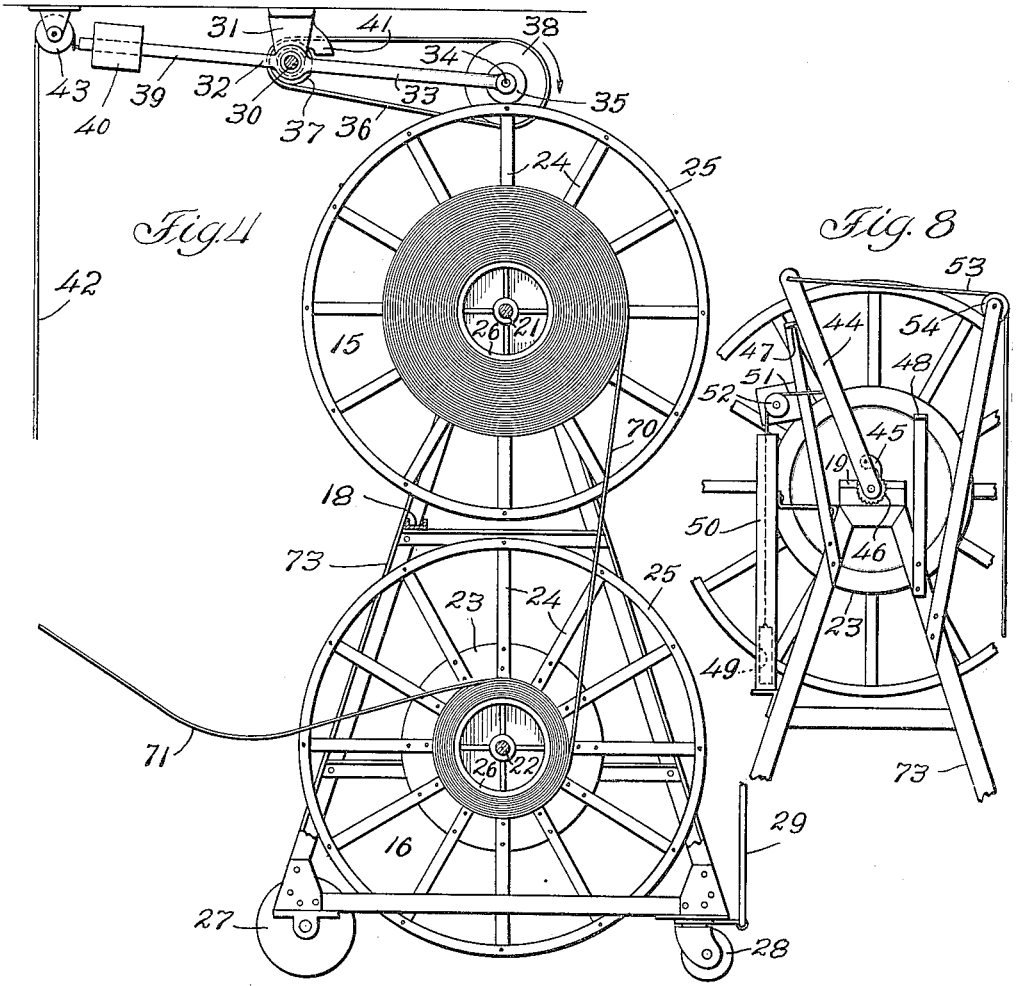
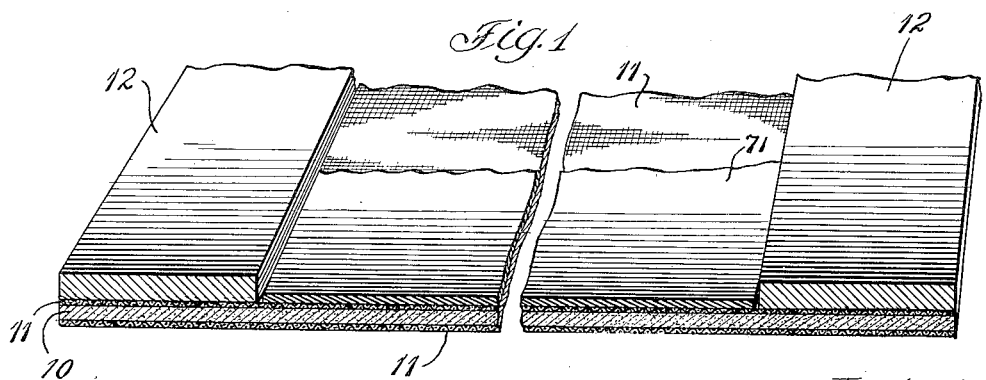
Inventor:
Ray R. Hunt
By Eugene M. Giles atty.

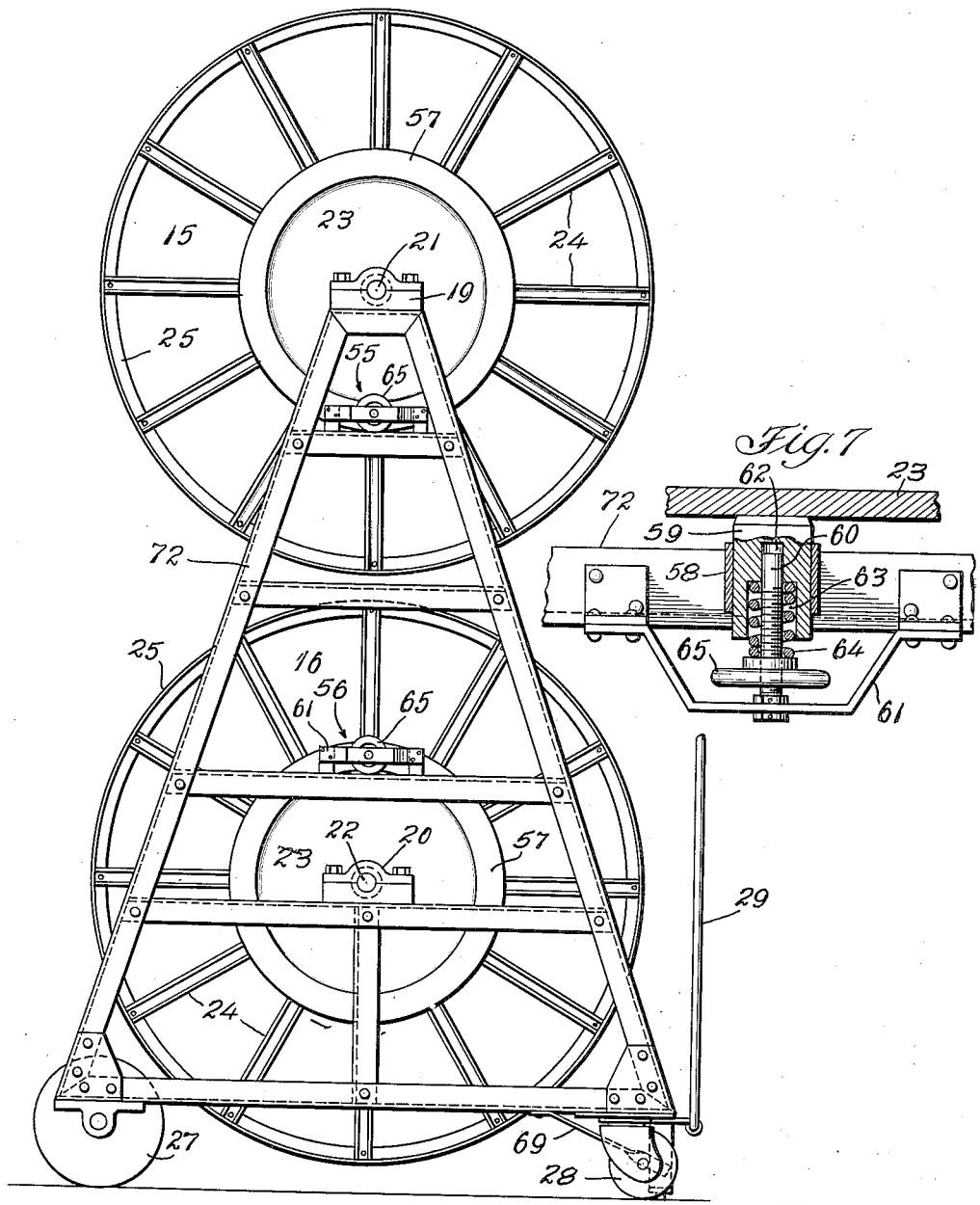

May 9, 1933.  R. R. HUNT  1,908,425
LINER
Filed March 17, 1930  3 Sheets-Sheet 3
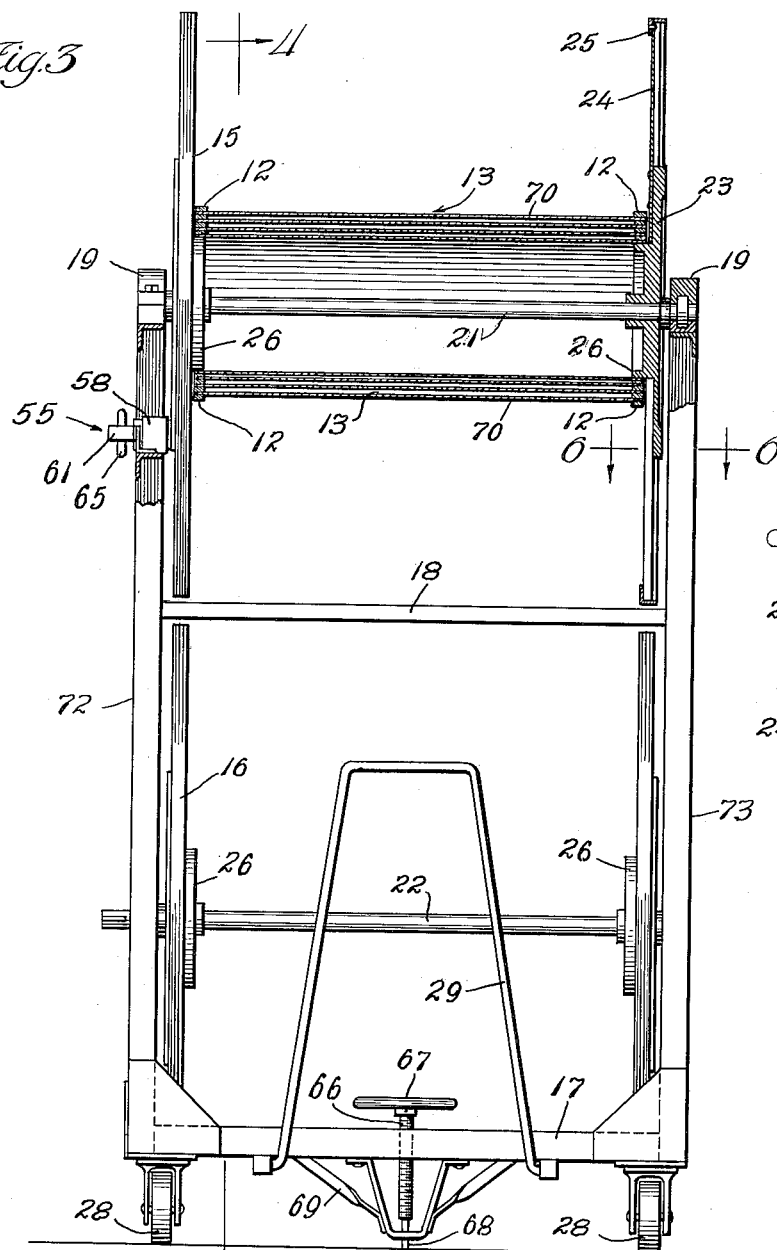
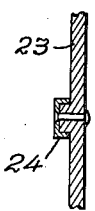
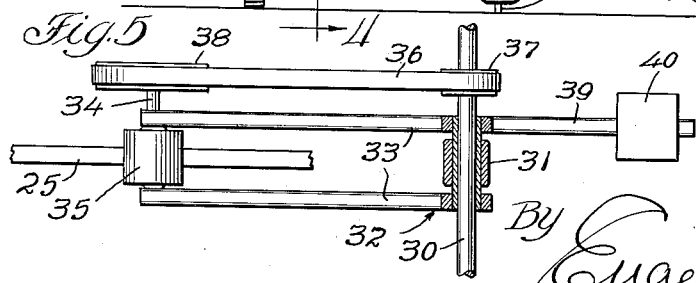
Inventor:
Ray R. Hunt
By Eugene M. Giles Atty.

Patented May 9, 1933

1,908,425

UNITED STATES PATENT OFFICE

RAY R. HUNT, OF MISHAWAKA, INDIANA, ASSIGNOR TO MISHAWAKA RUBBER AND WOOLEN MANUFACTURING COMPANY, OF MISHAWAKA, INDIANA, A CORPORATION OF INDIANA

LINER

Application filed March 17, 1930. Serial No. 436,549.

My invention relates to the handling and protecting of sheet materials, such for example as uncured rubber composition which comes from the calender rolls in a tacky condition necessitating protection against contact with other layers thereof or with other materials which might adhere to or impair the finished surface thereof, and this invention has reference more particularly to the construction of a ribbon or belt suitable for this purpose and to the method of and apparatus for handling and protecting such material.

In various lines of manufacture it is necessary or desirable to prepare and use materials in sheet form while in a condition in which contact with adjoining layers thereof will injure the material, and if such sheet material is not used as it is made and has to be accumulated or transferred from one place to another, considerable difficulty is experienced in collecting it so that it may be conveniently handled and transferred from place to place without damage or injury. This is particularly true in the manufacture of rubber goods such as footwear wherein large quantities of calendered rubber composition are required to be cut up into pieces for subsequent use in the manufacture of the goods. Heretofore, it has been the practice to employ frames having fabric or other material stretched between the ends and sides thereof and forming a shallow recessed area within the frame to receive the sheet rubber which is cut into relatively short lengths as it comes from the calender and each such short length placed in a separate frame, the frames with lengths of sheet rubber thereon being arranged one above another in stacks and transported to the place or places where the sheet rubber is to be used. This not only entails considerable labor in cutting the rubber into the relatively short lengths and handling the frames but there is a substantial loss at the ends due to shrinkage with uneven thickening, and wastage in cutting these lengths of rubber into the various sizes and shapes required in the manufacture of the goods. This wastage is particularly pronounced in calendering rubber with engraved rolls as the pattern or blanks at the ends are deformed by the shrinkage and have to be discarded. Moreover, in warm weather or when rich stock is being used, the surface of the rubber is frequently impaired by printing of the texture of the fabric of the frame thereon.

With my invention I have provided an improved separator for holding superposed layers of rubber composition out of contact with one another and which may be readily constructed in the form of a long ribbon or belt capable of accommodating a correspondingly long length of the rubber composition. Moreover, this ribbon or belt, when constructed in accordance with my invention may be wound, together with the length of rubber composition, in a roll so that it forms a compact bundle with the rubber safely stored therein and protected against injury. Furthermore, I have also provided an apparatus whereby the separator ribbon or belt may be conveniently fed to and from a reel upon which the rubber is wound and which said apparatus is movable as a unit from place to place so that a supply of rubber may be collected thereon from the calender, transported to the place of use and supplied therefrom as required. An apparatus of this character in a size and form which is readily portable from place to place around a plant will accommodate a strip of calendered rubber seven hundred or more feet in length and not only saves a large amount of wastage heretofore experienced in cutting the rubber into the various sizes and shapes required in the manufacture of rubber goods, but also considerable loss of time and labor in cutting the calendered rubber into relatively short lengths and handling the frames and at the same time affords a protective carrier and covering which insures the rubber reaching the place of use in perfect condition.

The principal objects of my invention are to protect sheets of uncured rubber composition and other materials in an improved manner; to avoid the necessity of cutting such materials into the relatively short lengths required with the protecting means heretofore employed; to avoid the shrinking and uneven thickening which occurred with such short lengths; to permit long lengths of uncured calendered rubber composition to be accumulated and transferred from the calender to the place of use; to avoid the wastage heretofore experienced in cutting calendered rubber into the pieces required for manufacture of rubber goods such as footwear; to provide an improved protector and support for sheets of calendered rubber and other tacky materials; to construct the protector so that it may be made readily, and at a comparatively low cost and in any desired lengths and wound in a roll; to provide an apparatus for conveniently winding and unwinding the protective ribbon or belt to accumulate a supply of calendered rubber or other material thereon and to discharge the rubber or other material therefrom; to construct the apparatus as a portable unit so that it may be readily transported from place to place to receive and deliver the material at different places; to provide a convenient mechanism under the control of the operator for regulating the supply of material from the apparatus; and in general to provide an improved method of protecting and handling lengths of uncured calendered rubber and other materials and also a construction of protector ribbon or belt of a desirable character which may be used repeatedly for temporarily storing lengths of calendered rubber or other materials in a protected manner and also a simple winding and unwinding apparatus whereby the protector ribbon or belt may be conveniently used.

On the drawings:

Fig. 1 is a transverse section of the winding ribbon or separator and shows a fragmentary portion thereof in perspective;

Fig. 2 is a side view of the frame or carriage on which the ribbon or separator is wound;

Fig. 3 is a front view of the frame or carriage with upper portions thereof in sections;

Fig. 4 is a reduced sectional view of the frame or carriage taken substantially on the line 4—4 of Fig. 3 and shows the ribbon or separator on the reels and also one form of mechanism for operating the reels to feed the rubber or other material from the lower reel;

Fig. 5 is a top view, partly in section, of the mechanism shown in Fig. 4 for feeding the material from the lower roll;

Fig. 6 is a fragmentary sectional view on the line 6—6 of Fig. 3 showing details of the construction of the reels;

Fig. 7 is an enlarged detail view partly in section, of the brake mechanism employed in connection with the reel, and Fig. 8 is a side view of the upper portion of the frame or carriage showing a modified form of mechanism for operating the reels to feed the material from the lower roll.

Referring to the drawings, and particularly to Fig. 1 which shows the form of ribbon or belt which I prefer to use as a separator and protector for uncured calendered rubber composition, the reference numeral 10 indicates the body or stiffening element of the ribbon or belt which is of heavy paper or cardboard and has a facing 11 of fabric adhesively secured on each side thereof. A strip 12 of material is secured along each edge of this laminated cardboard and fabric ribbon or belt to form a wide shallow channel or recess 13 (see Fig. 3) on the surface of the ribbon or belt and between the strips 12 to accommodate the length of calendered rubber, and these strips 12 also serve as spacers to hold each succeeding layer of the ribbon or belt out of contact with the rubber composition in the channel 13 of the preceding layer of the ribbon or belt. These strips or spacers 12 are preferably made of rubber composition and rag stock or fibre calendered to gauge and adhesively secured to the edge of the ribbon or belt, the thickness of said strips being determined by the spacing which is found necessary between successive layers of the ribbon or belt to adequately protect the material wound therebetween.

In practice I have used a ribbon or tape 39 inches in width overall with a body or stiffening element 10 of #045 plain chip board, No. 4 finish with a facing 11 of No. 360 sheeting cemented on each side thereof and with raised edges or spacers 12 about one-eighth of an inch thick and three-quarters of an inch in width. This has been found to afford a durable and entirely satisfactory construction of ribbon or belt for handling calendered rubber composition.

The chip board is readily obtainable and at a comparatively low cost in any desired lengths and affords adequate stiffening or body for the belt which is reinforced to withstand pulling and winding strains by the layers 11 of fabric which provide a satisfactory surface upon which to wind the tacky calendered rubber. Moreover, the use of the spacing strips 12 is not only a convenient way of providing the necessary channel or recess 13 in which to locate the rubber composition or other material but these strips 12 also further reinforce the belt or ribbon and particularly against wear and tear along the edges.

The strips 12 may, of course, be arranged partly on one side and partly on the other side of the belt or ribbon or they may even be separate therefrom and fed between successive convolutions of the belt or ribbon as the latter is wound so as to insure the desired spacing therebetween, but I prefer to use a form of belt or ribbon such as above described. This ribbon or belt may be made and used in any desired lengths, depending upon the facilities for winding and handling same, a convenient portable unit such as I have described hereinafter being capable of accommodating a belt or ribbon of 700 feet or more in length which accomplishes a great saving in time and labor and avoids the wastage which has been experienced heretofore in cutting calendered rubber composition in short lengths and handling it in frames.

The belt or ribbon may be utilized in any convenient manner or handled with any desired form of apparatus for loading with calendered rubber or other material, transporting from place to place and feeding the rubber or other material therefrom, but I prefer to employ a unit such as hereinafter described having reels to and from which the ribbon or belt is transferred in the feeding of the calendered rubber or other material onto the ribbon or belt and removal of the material therefrom, or in other words the loading and unloading operations, and this apparatus is preferably portable so that it may be readily moved to the place of loading and operated to wind the ribbon from one reel onto the other so as to receive a length of the calendered rubber or other material thereon, then transferred to the place where the material is to be used and operated to wind the ribbon or belt back on the original reel while the material is being removed therefrom.

This portable unit, as shown in Figs. 2 to 7 inclusive consists of a reel supporting frame with the reels 15 and 16 mounted thereon in superposed relation, said supporting frame comprising side frame members 72 and 73, shown herein of angle iron construction and triangular form and held in spaced relation by front and rear cross members 17 at the bottom corners (one only being shown in Fig. 3) and one or more cross members 18 at an elevated position, said members being located so that they will not interfere with the reels or the ribbon or belt as it is transferred to and from the reels. The said frame members are provided with corresponding upper and lower bearings 19 and 20 respectively for the upper and lower shafts 21 and 22 of the reels, which latter may be of any suitable construction. Those shown herein consist of end discs 23 secured to the shaft 21 or 22 in proper spaced relation to receive the ribbon or belt therebetween and each disc has a plurality of radial arms or spokes 24 secured thereto at their inner ends and with a peripheral rim 25 secured to the outer ends thereof so as to form relatively large spider-like ends for the reels with a minimum of material and weight. Each disc 23 has a circular flange 26 extending inwardly from the inner face and upon which the ribbon or belt is wound, this flange being of suitable width to accommodate edge portions of the ribbon or belt corresponding to the width of the spacer strips 12 so that the edges of the ribbon or belt are solidly supported as the latter is wound on the reel and it will be readily understood that by reason of the stiffening of the ribbon or belt by the chip board or body element 11 and the longitudinal curvature thereof in winding, the portions of the belt between the supported edges afford ample support for the rubber and are reinforced against sagging and possible contact with the layer of rubber thereunder.

A pair of supporting wheels 27 are secured to the rear end of the frame of the device and a pair of casters 28 at the front, a handle 29 also being provided at the front of the frame for pulling the apparatus around from place to place.

The reels 15 and 16 may be operated in any convenient manner to wind and unwind the ribbon or belt and to this end the shaft 22 of the lower reel 16 upon which the ribbon or belt with the rubber or other material thereon is preferably wound, may be extended as shown at the left of Fig. 3 to receive a connection for rotating the lower reel in the loading operation. After the device is loaded with the rubber or other material it is transferred to the place of use and in the case of calendered rubber compound it is usually desirable that the operator control the operation of the reels so that he can unwind the ribbon and rubber from the lower reel as he requires it for use.

For conveniently accomplishing this control of the unwinding operation a constantly driven shaft 30 is mounted above and adjacent the position of use of the rubber from the device in hangers 31, one of these being substantially in line with one of the ends of the upper reel when the winding apparatus is in the position where the operator uses the rubber. This hanger 31 has a frame 32 pivoted thereon so as to swing about the axis of the shaft 30 and has a pair of arms 33 at one side of the shaft carrying a short shaft 34 at the outer end with a wide face pulley 35 thereon and operated through the belt 36 and pulleys 37 and 38 from the shaft 30 in the direction indicated by the arrow in Fig. 4, said pulley 35 being located above the position of one of the ends of the upper reel 15 so that the latter may be operated by the pulley 35 by engaging the latter with the rim 25 of the reel end. The swinging frame 32 has an arm 39 at the opposite side of the shaft 30 with a counterweight 40 thereon for normally holding the opposite end of the frame against the stop 41 of the hanger 31 in which position the pulley 35 is elevated slightly above the rim 25 of the reel, and a cord 42, attached to the end of the arm 39 and extending over the sheave 43, is located within convenient reach of the operator so that by pulling on the cord 42 he may tilt the frame 32 to engage the constantly driven pulley 35 with the rim 25 of the upper reel and operate the latter as desired to wind the ribbon or belt thereon and thus unwind same from the lower reel.

A modified form of unwinding device is shown in Fig. 8 wherein a lever 44 is pivoted on one end of the upper shaft 21 and has a ratchet pawl 45 engaging with a ratchet wheel 46 on the shaft 21. This lever 44 works between stops 47 and 48 and is held in the rearward position against the stop 47 by the weight 49 which is enclosed in a tube 50 and connected with the lever 44 by the cord 51 which extends over the sheave 52. A cord 53 is also connected with the lever 44 and extends over the sheave 54 to a position within convenient reach of the operator who may thus operate the upper reel 15 to wind the ribbon or belt thereon through the ratchet 46 and pawl 45 construction.

To prevent overthrow of the reels in the winding and unwinding operations, one of the triangular side members of the main frame is provided with upper and lower braking devices 55 and 56 which co-operate with a circular braking surface 57 on the adjoining end disc 23 of the respective reel. These braking devices, which may be of any suitable construction, are alike in the illustrated structure each having a housing 58 on the machine frame with a brake shoe 59 held against turning movement therein and slidable in the housing to and from the braking surface 57 of the respective disc 23. A threaded shaft 60 has the outer end secured to a bracket member 61 on the main frame and has the inner end seated in a socket 62 of the brake shoe and the latter has an enlarged seat 63 around the shaft for the inner end of the spring 64 which has the outer end engaged by the hub of the hand wheel 65 which is threaded on the shaft 60 and adapted to regulate the tension of the spring 64 and the resulting frictional engagement of the brake block 59 with the respective reel disc 23.

In using this apparatus it is desirable to hold it in the locations for winding the rubber thereon and unwinding the rubber therefrom and for this purpose a screw 66 with hand wheel 67 has a threaded engagement with the frame member 17 and the lower reduced end 68 is slidingly engaged through an aperture in the brace 69 so as to be engaged with and withdrawn from the floor for holding the portable frame in a stationary position.

In using this device, assuming that it is located and locked by the screw 66 in position to receive the rubber from the calender rolls and the ribbon, which is indicated as a whole by the numeral 70 is wound on the upper reel 15 with the outer end connected with or started on the lower reel 16, the end of the rubber, which is indicated herein at 71, from the calender rolls is started on the lower reel in the channel or shallow recess 13 of the ribbon 70 thereon and as the rubber is supplied from the calender the reel 16 is rotated at the proper rate of speed to wind the rubber 71 thereon and at the same time the ribbon 70 is unwound from the upper reel and wound on the lower reel 16 between successive layers of the rubber.

When the ribbon 70 has been entirely or almost entirely wound on the lower reel 16, the rubber strip 71 is cut, after which the winding device is moved to and locked by the screw 66 in the position where the rubber is to be used and with the rim 25 of the upper reel directly under the pulley 35. The cord 42 is then pulled and held downwardly to engage the pulley 35 with the rim 25 of the upper reel and the latter rotated to feed the rubber from the lower reel as required and at the same time wind the ribbon 70 back on the upper reel and when the rubber is all removed from the lower reel the ribbon has been transferred to the upper reel and the device is ready to receive another loading of rubber from the calender.

While I have shown and described my invention in a preferred form, I am aware that various changes and modifications may be made therein without departing from the principles of my invention, the scope of which is to be determined by the appended claims.

I claim as my invention:

1. A liner for removably supporting and separating the convolutions of a roll of uncured sheet rubber, said liner comprising a stiffening layer of bendable fibrous sheet material and a layer of fabric secured together in the form of a laminated ribbon and said ribbon being provided along the edges with means whereby successive windings of the ribbon are spaced apart a predetermined distance to accommodate the sheet rubber freely therebetween.

2. A liner for removably supporting and separating the convolutions of a roll of uncured sheet rubber, said liner comprising a laminated paper and fabric ribbon adapted to be wound into a roll with the sheet rubber thereon and said laminated paper and fabric ribbon having means along the edges whereby successive windings of the ribbon are spaced apart a predetermined distance to accommodate the sheet rubber freely therebetween.

RAY R. HUNT.